US010394309B2

(12) United States Patent
Teoh et al.

(10) Patent No.: US 10,394,309 B2
(45) Date of Patent: Aug. 27, 2019

(54) POWER GATED COMMUNICATION CONTROLLER

(71) Applicant: INTEL CORPORATION, Santa Clara, CA (US)

(72) Inventors: Tiong Hong Teoh, Johor (MY); Zeeshan Sarwar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 15/396,394

(22) Filed: Dec. 30, 2016

(65) Prior Publication Data

US 2017/0115724 A1 Apr. 27, 2017

Related U.S. Application Data

(63) Continuation of application No. 15/279,891, filed on Sep. 29, 2016, which is a continuation of application (Continued)

(30) Foreign Application Priority Data

Dec. 28, 2011 (MY) .......................... PI 2011006341

(51) Int. Cl.
G06F 1/00 (2006.01)
G06F 1/3287 (2019.01)
G06F 1/3209 (2019.01)
G06F 1/3234 (2019.01)
G06F 13/16 (2006.01)
(Continued)

(52) U.S. Cl.
CPC .......... *G06F 1/3287* (2013.01); *G06F 1/3209* (2013.01); *G06F 1/3234* (2013.01); *G06F 1/3278* (2013.01); *G06F 13/161* (2013.01); *G06F 13/4282* (2013.01); *G06F 3/0611* (2013.01); *H04L 1/0018* (2013.01); *H04L 43/0852* (2013.01); *H04L 47/32* (2013.01); *Y02D 10/151* (2018.01);
(Continued)

(58) Field of Classification Search
CPC .. G06F 1/3287; G06F 13/4282; G06F 13/161; G06F 1/3234; G06F 1/3278; G06F 1/3209; G06F 3/0611; Y02D 10/151; Y02D 50/20; Y02D 10/171; Y02D 10/157; H04L 47/32; H04L 1/0018; H04L 43/0852
See application file for complete search history.

(56) References Cited

U.S. PATENT DOCUMENTS 7,386,738 B2    6/2008  Trappeniers et al.
7,702,825 B2    4/2010  Howard
(Continued)

OTHER PUBLICATIONS

Non-Final Office Action for U.S. Appl. No. 15/279,891, dated Apr. 10, 2018.
(Continued)

*Primary Examiner* — Xuxing Chen
(74) *Attorney, Agent, or Firm* — Green, Howard & Mughal LLP

(57) ABSTRACT

A method includes detecting a communication event over a communication bus 130 coupled to a device, and in response to detecting the communication event, deactivating a module of the device. The method may further include sending a data throttle packet over the communication bus 130 while the deactivated module reactivates.

24 Claims, 6 Drawing Sheets

Related U.S. Application Data

No. 13/996,308, filed as application No. PCT/US2012/070618 on Dec. 19, 2012, now Pat. No. 9,489,032.

(51) Int. Cl.
  *G06F 13/42* (2006.01)
  *G06F 3/06* (2006.01)
  *H04L 1/00* (2006.01)
  *H04L 12/823* (2013.01)
  *H04L 12/26* (2006.01)

(52) U.S. Cl.
  CPC .......... *Y02D 10/157* (2018.01); *Y02D 10/171* (2018.01); *Y02D 50/20* (2018.01)

(56) References Cited

U.S. PATENT DOCUMENTS

| | | |
|---|---|---|
| 7,809,961 B2 | 10/2010 | Dahan et al. |
| 7,957,777 B1 | 6/2011 | Chuong |
| 7,958,483 B1 * | 6/2011 | Alben .................. G06F 1/3203 713/322 |
| 2005/0140349 A1 | 6/2005 | Ho |
| 2006/0075271 A1 | 4/2006 | Lilja et al. |
| 2007/0061496 A1 | 3/2007 | Nishino |
| 2009/0249090 A1 | 10/2009 | Schmitz |
| 2010/0162022 A1 | 6/2010 | Kim et al. |
| 2011/0191608 A1 | 8/2011 | Vetteth |
| 2011/0238869 A1 | 9/2011 | Fredriksen et al. |

OTHER PUBLICATIONS

Final Office Action for U.S. Appl. No. 13/996,308, dated Apr. 28, 2016.

Non Final Office Action for U.S. Appl. No. 13/996,308, dated May 21, 2015.

Non Final Office Action for U.S. Appl. No. 13/996,308, dated Nov. 30, 2015.

Notice of Allowance for U.S. Appl. No. 13/996,308, dated Jun. 20, 3013.

Notification Concerning Transmittal of International Preliminary Report in Patentability Chapter 1 of the Patent Cooperation Treaty, dated Jul. 10, 2014, for International Application No. PCT/US2012/070618, 7 pgs.

PCT Notification of Transmittal of the International Search Report and the Written Opinion of the International Searching Authority, or the declaration, dated Apr. 16, 2013, for International Application No. PCT/US2012/070618, 10 pgs.

Final Office Action from U.S. Appl. No. 15/279,891 notified Sep. 28, 2018, 16 pgs.

* cited by examiner ns according to some embodiments.
POWER GATED COMMUNICATION CONTROLLER

CLAIM OF PRIORITY

This United States continuation patent application is related to, and claims priority to, U.S. patent application Ser. No. 15/279,891 entitled "POWER GATED COMMUNICATION CONTROLLER," filed Sep. 29, 2016, which is a continuation of U.S. patent application Ser. No. 13/996,308, filed Jun. 20, 2013 entitled "POWER GATED COMMUNICATION CONTROLLER," which is a National Stage Application of International Patent Application No. PCT/US2012/070618, filed Dec. 19, 2012, which claims priority to Malaysian Patent Application No. PI 2011006341, filed Dec. 28, 2011, the entire contents of which are incorporated herein by reference.

BACKGROUND

With more electronic devices relying on battery power, power consumption is becoming a more important criterion in the design of electronic devices and peripheral devices that connect to electronic devices. One area that consumes power in electronic devices is communication controllers, such as a Universal Serial Bus (USB), serial, or parallel communication controller. These controllers may require peripheral devices to respond repeatedly to polling from a host device. In some instances, an entire device controller on a peripheral device may be powered simply to respond to polling from a host device.

A conventional technique to reduce power consumption in devices, such as peripheral device controllers, is clock gating. In this technique, the clock to the individual elements in a peripheral device controller is stopped. This reduces the dynamic power, which is the power dissipated by circuits when the circuits are switching and active. However, with device controllers being designed with smaller technologies, such as 90 nm technologies and smaller, leakage power, the power dissipated by circuits when the circuits are inactive or not switching, may result in more power dissipation than dynamic power dissipation.

DETAILED DESCRIPTION

Figure 1A:
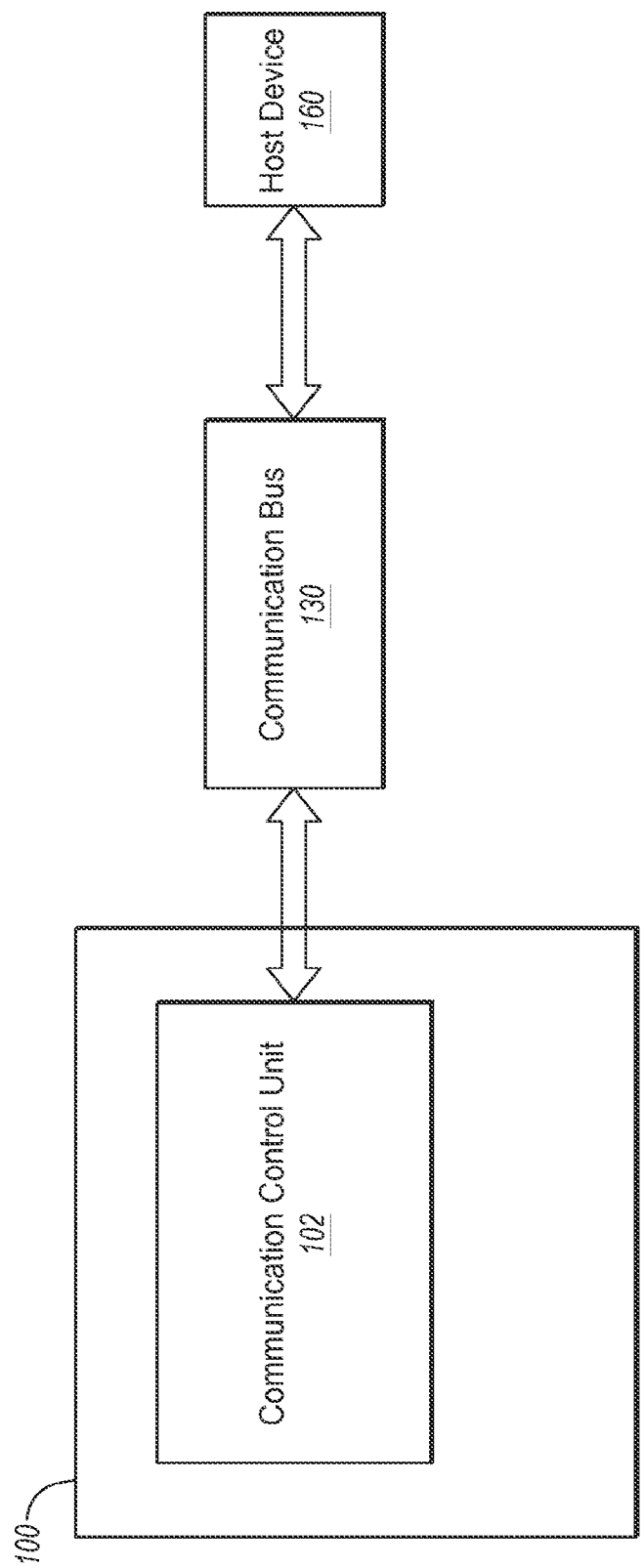
FIG. 1A is a block diagram of an example system according to some embodiments.

FIG. 1A is a block diagram of an example system 100 according to some embodiments. The system 100 may be associated with a peripheral device that may be adapted to communicate with a host device 160 over a communication bus 130 using, for example, a serial, parallel, or Universal Serial Bus (USB) interface, such as an interface defined by the USB 2.0 standard (April 2000). For example, the system 100 may include a communication control unit 102 to support communication between the host device 160 and the system 100 over the communication bus 130. For example, in some embodiments, the communication control unit 102 may support communications between a peripheral device, such as but not limited to, a mouse, keyboard, memory device, or printer and a host device, such as but not limited to, a desktop, laptop, tablet, smart phone or other computing unit. Furthermore, in some embodiments, the communication control unit 102 may support communications between two computing units, such as, tablets, smart phones, or laptops, where one of the computing units acts as a peripheral device and one of the computing units acts as a host device.

Note that the communication control unit 102 may be associated with peripheral device that communicates through the communication control unit 102 with the host device 160. In some embodiments, the host device 160 may control the communication bus 130. In these and other embodiments, the communication control unit 102 may be unable to send packets over the communication bus 130 or generate an interrupt independent of the host device 160. For the communication control unit 102 to send packets to the host device 160 or generate an interrupt, the communication control unit 102 must wait to receive an inquiry from the host device 160 asking if the communication control unit 102 is ready to receive packets or has packets to send to the host device 160. This may be referred to as the host device 160 polling the communication control unit 102.

In some embodiments, to reduce latency and maintain adequate data transfer, the host device 160 may poll the communication control unit 102 at set intervals or at undefined intervals. In particular, in applications where the communication control unit 102 is associated with a peripheral device that generates large amounts of data in a short time frame, the host device 160 may poll the communication control unit 102 more frequently to ensure adequate data transfer between the host device 160 and the peripheral device. The communication control unit 102 may be required to respond to the polling of the host device 160, even if the communication control unit 102 has not received data from its associated peripheral device to send to the host device 160 or cannot receive data from the host device 160.

In some embodiments, the communication control unit 102 may detect the occurrence of certain communication events between the host device 160 and the communication control unit 102 and deactivate a portion of the communication control unit 102 to reduce the power consumption of the system 100. In some embodiments, white portions of the communication control unit 102 are deactivated, the communication control unit 102 may continue to respond to polling by the host device 160. Furthermore, the communication control unit 102 may, upon detecting or determining a reactivation event, reactivate the deactivated portions of the communication control unit 102. While the deactivated portions of the communication control unit 102 are reactivating, the communication control unit 102 may continue to respond to polling by the host device 160 by sending data throttle packets. By deactivating portions of the communication control unit 102, the power consumed by the communication control unit 102 may be reduced.

Figure 1B:
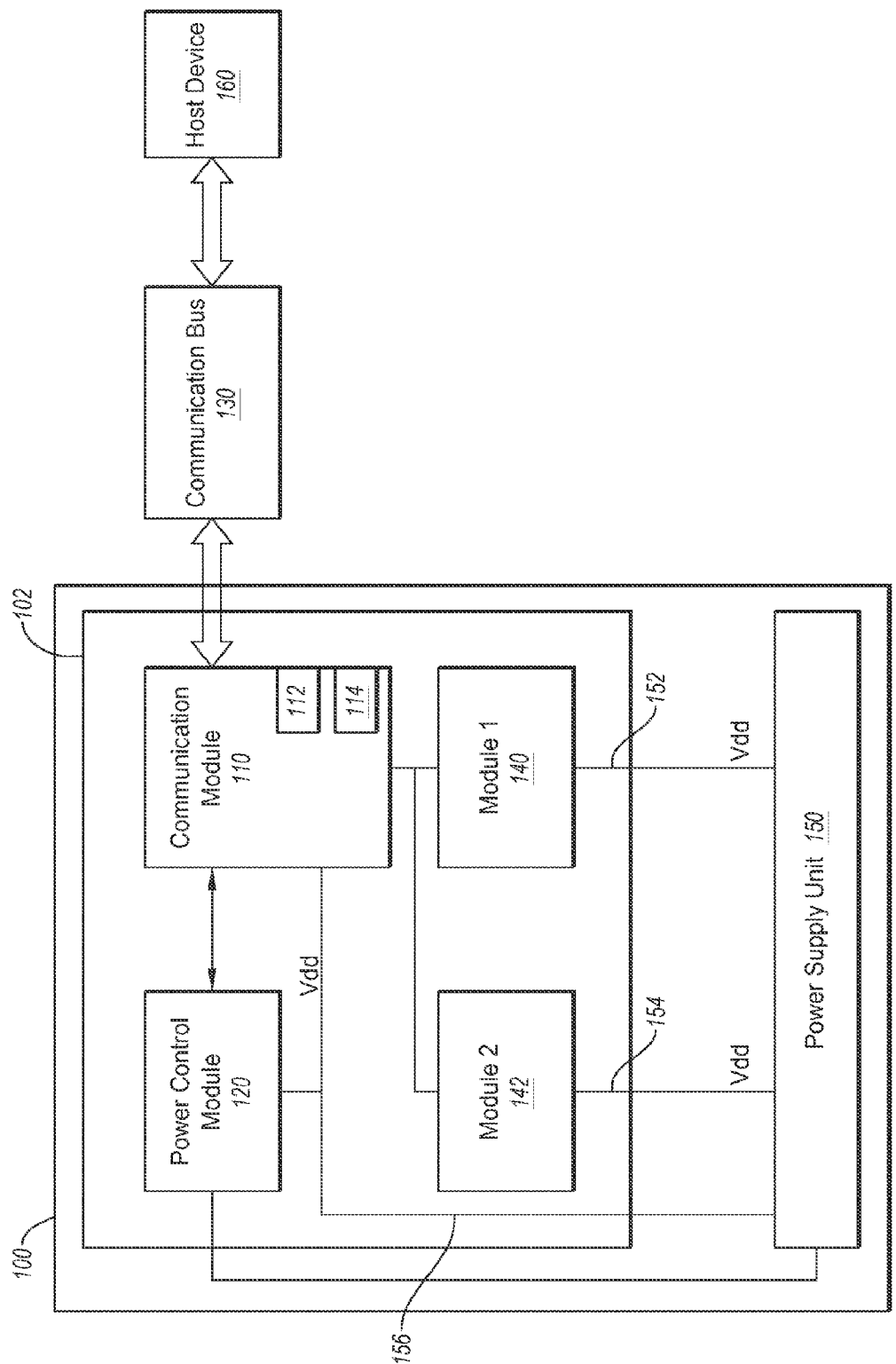
FIG. 1B is a block diagram illustrating further details of the example system of FIG. 1A according to some embodiments.

FIG. 1B is a block diagram illustrating further details of the example system 100 of FIG. 1A according to some embodiments. The system 100 may include the communication control unit 102 and a power supply unit 150 that provides power to and receives commands from the communication control unit 102. The communication control unit 102 includes a communication module 110, a power control module 120, and may include various other modules, such as first and second modules 140, 142. The first and second modules 140, 142 are illustrated only to depict other modules within the communication control unit 102. In some embodiments, the communication control unit 102 may have more or less than two modules. In some embodiments, the first and second modules 140, 142 may be the same or different and may be a buffer memory, control status registers, interface module for communication with a peripheral device, data transfer communication protocol modules, or some other module in the communication control unit 102.

In some embodiments, the communication module 110 and the power control module 120 may be implemented in hardware, programmable devices, or some combination of both. In some embodiments, the communication module 110 and the power control module 120 may not be separate modules and the functionality of both modules may be implemented in the same module.

The communication module 110 is coupled to the communications bus 130 and may be configured to handle communication protocols for communicating with the host device 160. In particular, the communication module 110 may be configured to receive packets from and send packets to the host device 160 and respond appropriately to inquiry packets from the host device 160 in accordance with a predetermined protocol. Packets may include any packets sent over the communication bus 130. For example, packets may include polling and/or inquiry packets, such as token packets, packets for initializing the communication control unit 102, handshaking packets, data packets, and other packets sent between the communication control unit 102 and the host device 160.

The example communication module 110 also includes first and second endpoints 112, 114. Each of the first and second endpoints 112, 114 may be recognized by the host device 160 as a separate terminal communicating with the host device 160. For example, a peripheral device connected to the communication control unit 102 may contain two devices that communicate with the host device 160. Each of the devices may be assigned one of the first or second endpoints 112, 114 for communicating with the host device 160. By providing both the first and second endpoints 112, 114, the communication control unit 102 may handle communications between both devices and the host device 160. In some embodiments, the communication module 110 may contain more or less than two endpoints.

The power control module 120 is coupled to the communication module 110 and the power supply unit 150. The power control module 120 may be configured to detect a communication event occurring over the communication bus 130. The power control module 120 may detect a communication event over the communication bus 130 by intercepting the communications over the control bus 130 or by interfacing with the communication module 110.

Note that the communication event is not a command, suggestion, or any indication from the host device 160, or a peripheral device, that the communication control unit 102 should reduce power consumption, operate in a power saving mode, power down, sleep, hibernate, or anything of the like. For example, if the communication control unit 102 was part of a USB device controller, the communication event may not be a command from the host controller for the USB device controller to operate in a low power or suspend mode. Nor would the communication event be a command from the peripheral device connected to the USB device controller to enter a low power or suspend mode.

The communication event may instead relate to a sequence, pattern, timing, or otherwise, of packets sent or received by the communication control unit 102 during normal operation. For example, in some embodiments, a communication event may occur when the communication control unit 102 sends a certain number of packets indicating that the communication control unit 102 has no data to send to the host device 160 within a certain period. Or a communication event may occur when the communication control unit 102 sends a consecutive number of the same or similar types of packets. In these and other embodiments, the communication control unit 102 may be responding to the same inquiry packet received from the host device 160. In some embodiments, a communication event may occur when the interval between the same or similar types of packets received by the communication control unit 102 is greater than a predefine interval. Other sequences, patterns, timings and the like may also be used to indicate a communication event In response to detecting a communication event, the power control module 120 may deactivate the first module 140, the second module 142, or both of the first and second modules 140, 142. In some embodiments, the power control module 120 may deactivate the first and second modules 140, 142 by directing the power supply unit 150 to shut off the power to the first and second modules 140, 142 by shutting off the voltage and/or current to power supply lines 154 and 152 respectively, while maintaining voltage and/or current on a power supply line 156. In some embodiments, where the communication control unit 102 contains more or less modules than just the first and second modules 140, 142, the power control module 120 may deactivate one or more of the modules within the communication control unit 102. In some embodiments, the power control module 120 may deactivate all of the modules in the communication control unit 102 that are clot required to respond to one or more specific inquiries from the host device 160. For example, in some embodiments, if the communication control unit 102 was part of a USB device controller, the power control module 120 may deactivate all modules that are not required to receive a polling token from the host device 160 and respond with a packet indicating that the communication control unit 102 has no data to send to the host device 160, such as a NAK packet.

In some embodiments, the power control module 120 may also be configured to detect a reactivation event and reactivate one or both of the first and second modules 140, 142 that have been deactivated. In some embodiments, a reactivation event may include the communication control unit 102 receiving a certain type of packet from the host device 160 or data from a peripheral device.

In some embodiments, a reactivation event may depend on the previously detected communication event. For example, in some embodiments, if the detected communication event occurred because the communication control unit 102 indicated that it had no data to send to the host device 160, the reactivation event may be the communication control unit 102 receiving data from a peripheral device or the communication control unit 102 receiving a different inquiry from the host device 160, such as if the communication control unit 102 is available to receive data from the host device 160.

As another example, in some embodiments, if the detected communication event occurred because the intervals between packets from the host device 160 were greater than a predefined interval, the reactivation event may be the communication control unit 102 receiving data from a peripheral device, or a packet from the host device 160, during the interval between packets or an end of a deactivation period.

In some embodiments, if the reactivation event involved the communication control unit 102 receiving a packet from the host device 160 indicating that the host device 160 had data to send to the communication control unit 102, the power control module 120 may direct the communication module 110 to send a data throttle packet in response to the host device 160. The data throttle packet may indicate to the host device 160 that the communication control unit 102 is not ready to receive data from the host device 160. Thus, the data throttle packet may "throttle" or slow down a data transfer because the data throttle packet may cause the host device 160 to wait to send the data to the communication control unit 102. By causing the host device 160 to wait to send data, the communication control unit 102 may help to ensure that the deactivated first and second modules 140, 142 have reactivated and stabilized before a data transfer occurs.

In some embodiments, the power control module 120 may also monitor the communication bus 130 while one or both of the first and second modules 140, 142 reactivate. If the power control module 120 detects an inquiry packet from the host device 160, such as a polling packet, during the reactivation of the first and second modules 140, 142, the power control module 120 may direct the communication module 110 to send a data throttle packet to the host device 160 over the communication bus 130 to continue to allow the first and second modules 140, 142 to reactivate and stabilize before a data transfer occurs.

By throttling data transfers, the deactivation and reactivation of the first and second modules 140, 142 may be performed independently and without knowledge by the host device 160 or a peripheral device. If data transfers are not throttled while the first and second modules 140, 142 reactivate, the first and second modules 140, 142 may not be completely reactivated once a data transfers begins because the host device 160 and/or peripheral device may not be aware that the modules 140, 142 were deactivated and now reactivating. As a result, data and/or packets may be lost. Throttling data transfers may help the communication control unit 102 to maintain proper transfer protocols with the host device 160 and/or peripheral device without having to indicate to the host device 160 and/or peripheral device that the modules 140, 142 were deactivated or requiring support to deactivate and reactivate the modules 140, 142.

By deactivating one or both of the first and second modules 140, 142, the communication control unit 102 may reduce the amount of power consumed by the system 100. In some embodiments, where the communication control unit 102 is part of a USB device controller, depending on the application, the load, and the technology used to manufacture the USB device, deactivating one or more modules of the communication control unit 102 may reduce power consumption of the communication control unit 102 from between 15% to 90%, and on average may reduce the power consumption by approximately 40%.

Figure 2:
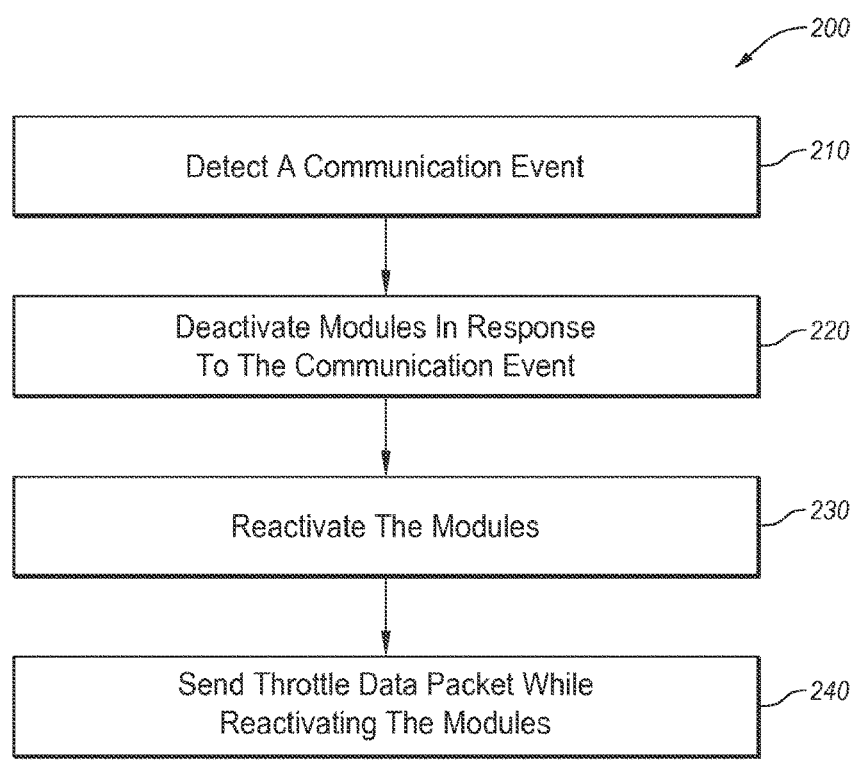
FIG. 2 is a flow chart of an example method according to some embodiments.

FIG. 2 is a flow chart of an example method 200 according to some embodiments. The method 200 may be performed, for example, by the system 100, or more particularly, by the communication control unit 102, described with respect to FIGS. 1A and 1B. The flow charts described herein do not necessarily imply a fixed order to the actions, and embodiments may be performed in any order that may be practicable. Note that any of the methods described herein may be performed by hardware, software (including microcode), or a combination of hardware and software. For example, a storage medium may store thereon instructions that when executed by a machine result in performance according to any of the embodiments described herein.

At 210, a communication event may be detected. The communication event may be related to a sequence, pattern, timing, or otherwise, of packets sent or received over a communication bus during normal operation. The communication event is not a command, suggestion, or any indication from a host device or a peripheral device communicating over the communication bus, for a communication control unit that handles communications over the communication bus, to reduce power or operate in a power saving mode. The communication event may indicate that given the current state of the communication control unit that certain modules within the communication control unit are not in need and may be deactivated.

In some embodiments, the communication event may occur when a number of packets sent over the communication bus exceeds a predetermined threshold. In some embodiments, for the packets to be counted, the packets may need be the same types and/or consecutive. Furthermore, in some embodiments, each packet may be sent in reply to art inquiry packet received over the communication bus.

In some embodiments, the communication event may occur when an interval between the first and second packets received over the communication bus, is longer than a reactivation latency of modules that may be deactivated. In some embodiments, the first and second packets may be received at the same or distinct communication endpoints.

At 220, one or more modules of the communication control unit may be deactivated in response to the communication event. In some embodiments, deactivating the modules may include eliminating voltage and/or current to the modules. For example, the voltage and/or current may be shut-off to the modules by switching external power rails. By deactivating the modules, the power used by the communication control unit may be reduced.

At 230, the one or more deactivated modules may be reactivated. Based on the current state of the communication control unit, the deactivated modules may need to be utilized. In some embodiments, the deactivated modules may be reactivated by supplying voltage and/or current to the deactivated modules. In some embodiments, only the deactivated modules that need to be utilized may be reactivated.

At 240, throttle data packets may be sent over the communication bus while the deactivating modules are reactivating. In some embodiments, the deactivated modules may have reactivation latency. During this latency period, the throttle data packets may be sent to delay data transfers between the communication control unit and the host device so that the deactivated modules may be fully activated during subsequent data transfer between the host device and the communication control unit.

In some embodiments, the method 200 may include additional actions. For example, the method 200 may also include detecting a reactivation event. The one or more deactivated modules may be reactivated when the reactivation event is detected. In some embodiments, the reactivation event may include the communication control unit receiving data to send over the communication bus or a change in an inquiry received over the communication bus. In some embodiments, the reactivation event may include the communication control unit receiving a third packet between the first and second packets or an end of a deactivation period.

In some embodiments, the method 200 may also include additional actions performed between detecting the deactivation event and deactivating one or more modules. For example, in some embodiments, after detecting the deactivation event, clock signals to the modules to be deactivated are stopped. Next, isolation cells may be activated on the outputs of the modules to be deactivated. The isolation cells may be used to control the data values that may be seen by the deactivated modules when they reactivated. Once the isolation cells are activated, the voltage and/or current to the modules to be deactivated may be shut-off to deactivate the modules.

In these and other embodiments, after the reactivation event, the voltage and/or current may be supplied to the deactivated modules. The isolation cells may also be deactivated and the clock signals may then be supplied to the deactivated modules to reactivate the modules.

Figure 3:
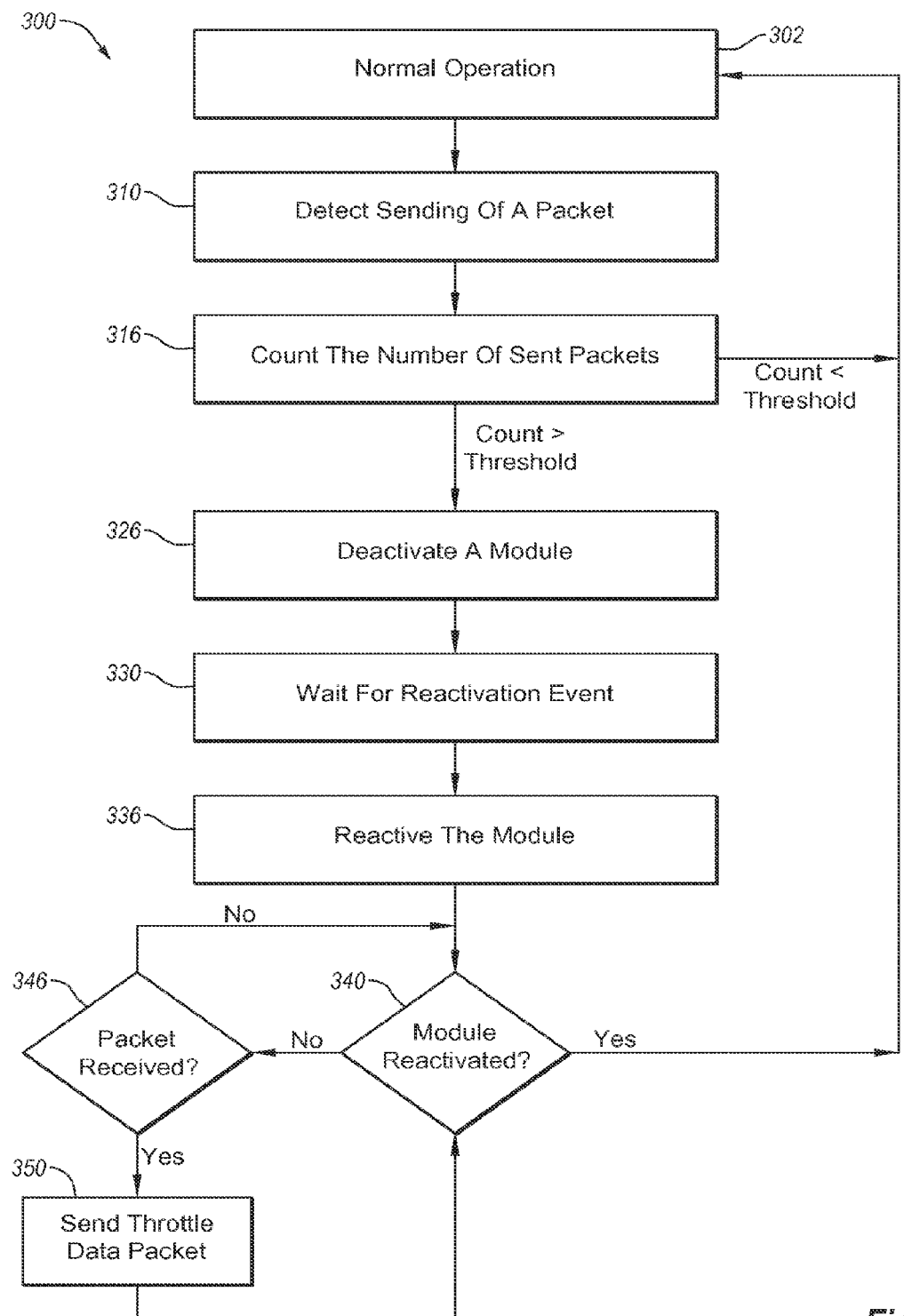
FIG. 3 is a flow chart of another example method according to some embodiments.

FIG. 3 is a flow chart of an example method 300 according to some embodiments. The method 300 may be performed, for example, by the system 100, or more particularly, by the communication control unit 102, described with respect to FIGS. 1A and 1B. The method 300 may be used to deactivate modules in a communication control unit when a timing interval between received packets is shorter than a reactivation latency of the deactivated modules.

At 302, normal operations may be performed and all modules may be activated. At 310, incoming and outgoing packets may be detected. For example, a power control module within the communication control unit may detect the incoming and outgoing packets. In some embodiments, an incoming inquiry packet may first be detected and then an outgoing response packet may be detected to determine a certain condition within the communication control unit. For example, if the communication control unit was a USB device controller, a received IN token packet and a sent NAK handshake packet may be detected. This may indicate that the host device and USB device controllers have no data to send to each other.

At 316, a consecutive number of the same received and/or sent packets may be counted. If the number of consecutive packets counted exceeds a predetermined threshold, the method 300 may proceed to 326. Otherwise, the method 300 proceeds to 302 and performs normal operations. The threshold number of packets may vary based on operational performance requirements, power requirements, and other needs. For example, in some embodiments, the threshold number maybe 3, 5, 10, 15, or some other number of packets.

At 326, a module in the communication control unit that may not be required to receive and send packets of the type that were counted at 316 may be deactivated.

At 330, monitoring for a reactivation event may occur. While monitoring for the reactivation event, packets, which do not cause a reactivation event, may continue to be received and packets may be sent in response. For example, packets of the type counted at 316 may not cause a reactivation event.

At 336, the deactivated modules may be reactivated once a reactivation event occurs. The reactivation event may indicate that the status of the communication control unit or host device has changed. For example, if the communication control unit was a USB device controller, a reactivation event may occur if either the USB device controller or host device has data to send to the other. If the reactivation event is the recite of a packet indicating the host device has data to transfer to the communication control unit, the power control module may direct a throttle data packet to be sent to the host device. For example, if the communication control unit was a USB device controller and the host device sent an OUT token packet, a USB device controller may send a NAK handshake packet to report that the device controller cannot receive data, thereby throttling the data exchange between the device controller and the host device.

At 340, it may be determined if the deactivated modules are reactivated and ready. If the modules are completely reactivated, the method 300 may proceed to 302. If the modules are not completely reactivated, the method 300 may proceed to 346.

At 346, it may be determined if a packet has been received while the modules are reactivating. If a packet has been received, the method 300 may proceed to 350, otherwise the method may proceed back to 340.

At 350, a data throttle packet may be sent to the host device to throttle outgoing or incoming data. The method 300 may then proceed back to 340, to wait for the deactivated modules to reactivate. Thus, the method 300 may continually check for packets and respond to any received packets while waiting for the deactivated modules to reactivate.

The method 300 may be used to deactivate modules when a timing interval between packets from a host device is shorter than a reactivation latency of modules that may be deactivate. For example, the method 300 may be implemented in a system with a high-speed USB device controller with a normal or high polling rate. Thus, the modules within the communication control unit may be deactivated during intervals when the host device polls the communication control unit but no data is being transferred, thereby reducing power consumption.

Figure 4:
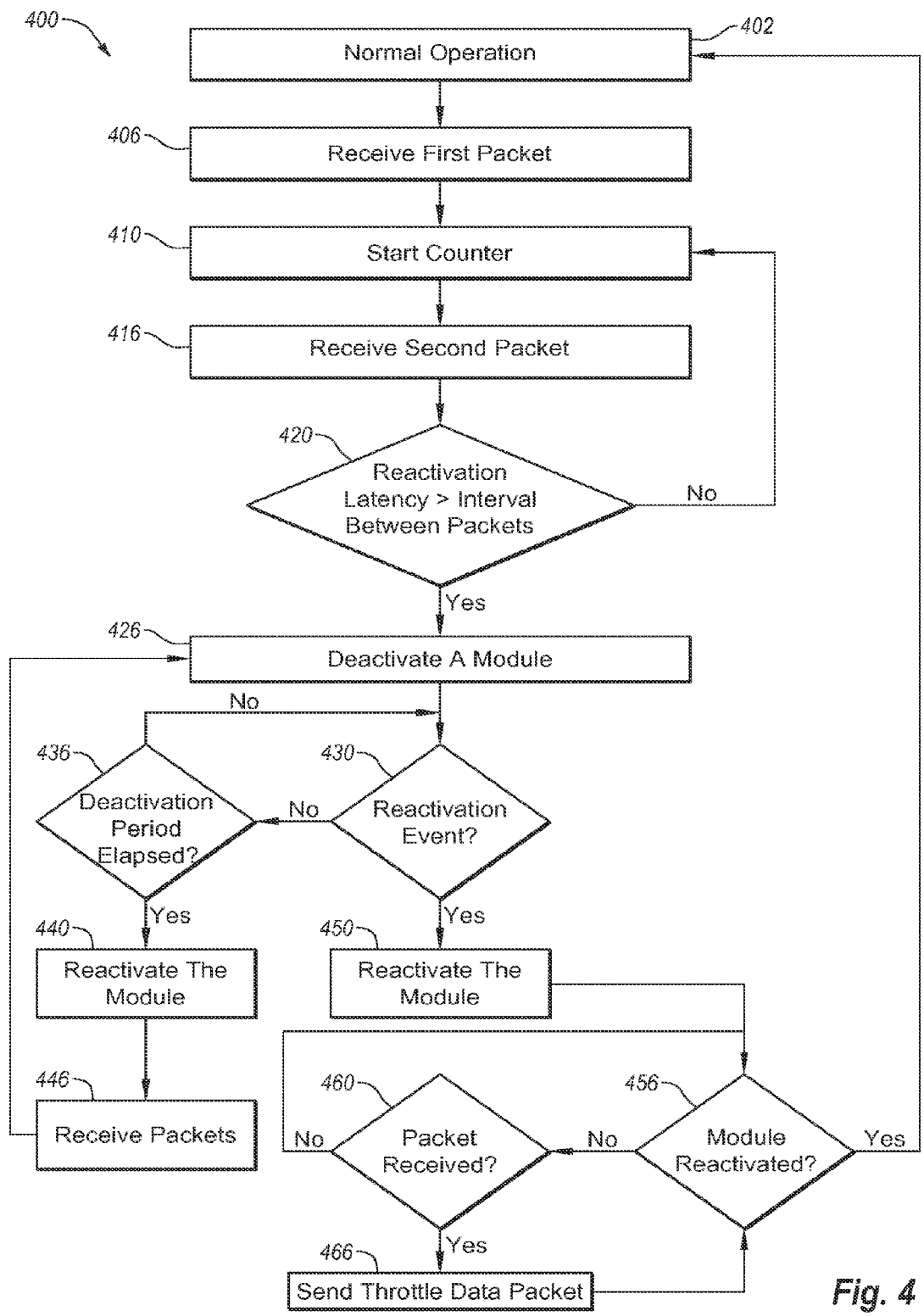
FIG. 4 is a flow chart of yet another example method according to some embodiments.

FIG. 4 is a flow chart of an example method 400 according to some embodiments. The method 400 may be performed, for example, by the system 100, or more particularly, by the communication control unit 102, described with respect to FIGS. 1A and 1B. The method 400 may be used to deactivate modules within a communication control unit during an interval between packets received by the communication control unit, when the interval between the packets is greater than a reactivation latency of the deactivated modules.

At 402, normal operations may be performed and all modules may be activated. At 406, a first packet may be received at a first endpoint. After the first packet is received, at 410, a counter may be started. At 416, a second packet may be received at either the first endpoint or another endpoint. After the second packet is received, at 420, it may be determined if the counter indicates that an interval between the first and second packets is greater than a reactivation latency of one or more modules within the communication control unit. If the interval is not greater than the reactivation latency, the method 400 may proceed to 410. Otherwise, the method 400 may proceed to 426.

At 426, one or more modules may be deactivated. In particular, modules with reactivation latencies less than the interval between the first and second packets may be deactivated. Thus, in some embodiments, depending on the reactivation latencies of the modules, some modules may be deactivated while other modules are not. A deactivation interval equal to the interval between the packets, minus the reactivation latency of the deactivated modules, may also be determined. A deactivation interval counter may also be started to indicate the start of the deactivation interval.

At 430, it may be determined if a reactivation event has occurred. For example, a reactivation may include receiving a packet during the deactivation interval. If no reactivation event has occurred, the method 400 may proceed to 436. Otherwise, the method 400 may proceed to 450.

At 436, it may be determined if the deactivation interval has lapsed. If the deactivation interval as lapsed, the method 400 proceeds to 440. Otherwise, the method 400 may proceed to 430. Thus, the deactivated modules may remain deactivated until a reactivation event occurs or the deactivation interval lapses.

At 440, the deactivate modules may be reactivated. At 446, a packet may be received and a packet may be sent in response. The method 400 may then proceed to 426. Thus, the deactivated nodules may be cyclically activated and deactivated.

At 450, the deactivated modules may be activated. At 456, it may be determined if the deactivated modules are reactivated and ready. If the modules are completely reactivated, the method 400 may proceed to 402. If the modules are not completely reactivated, the method 400 may proceed to 460.

At 460, it may be determined if a packet has been received while the modules are reactivating. If a packet has been received, the method 400 may proceed to 466, otherwise the method 400 may proceed back to 456.

At 466, a data throttle packet may be sent to the host controller to throttle outgoing or incoming data. The method 400 may then proceed back to 456 to wait for the deactivated modules to reactivate. Thus, when a reactivation event occurs, the method 400 may continually check for packets and responds to any received packets while waiting for the modules to reactivate.

The method 400 may thus be used to deactivate one or more modules within the communication control unit when the interval between packets from a host device is larger than the reactivation latency of the modules, thereby reducing power consumption.

Figure 5:
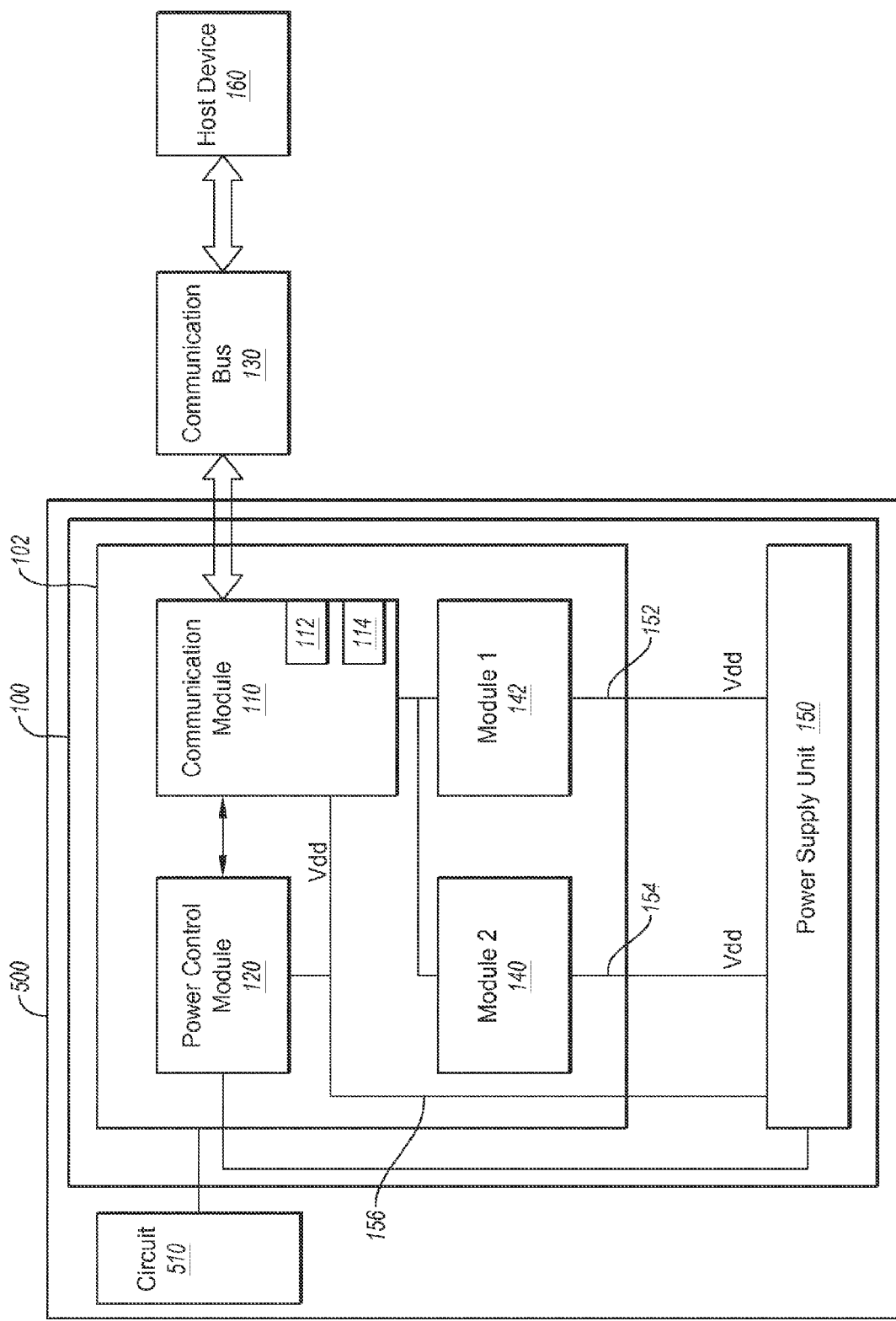
FIG. 5 is a block diagram of an example system that incorporates the example system of FIG. 1B according to some embodiments.

FIG. 5 is a block diagram of an example system 500 that incorporates the example system 100 of FIG. 1B, according to some embodiments. The system 500 may include a circuit 510 coupled to the communication control unit 102. The circuit 510 may be any circuit that generates data to send to and receive data from the host device 160. The communication control unit 102 may operate as communication circuitry to allow data transfers between the circuit 510 and the host device 160. For example, in some embodiments, the circuit 510 may be the circuitry in a mouse, keyboard, memory device, or printer and the host device 160 may be a desktop, laptop, tablet, smart phone or other computing unit. According to some embodiments, the host device 160 may include a display port (e.g., to be attached to one or more monitors). Furthermore, in some embodiments, the circuit 510 and be host device 160 may both be computing units, such as, tablets, smart phones, or laptops, where the circuit 510 acts as a peripheral device and the host device 160, as host. In some embodiments, the circuit 510 and host device 160 may be connected using the USB protocol. In these and other embodiments, the communication control unit 102 may act as a USB device controller.

Although particular system, hardware, and interface configurations have been described herein, embodiments may be performed with any other types of system hardware, and/or interface configurations. Similarly, although specific methods have been described, any number of other types of methods might be performed in connection with embodiments described here.

The several embodiments described herein are solely for the purpose of illustration. Persons skilled in the a will recognize from this description that other embodiments may be practiced with modifications and alterations limited only by the claims.

What is claimed is:

1. One or more non-transitory computer-readable storage media to store instructions that, when executed by a processor included in a first device, cause the processor to:
   enter, in response to a failure to receive any communication from a second device for at least a threshold period of time, a power saving mode;
   deactivate, while the first device is to operate in the power saving mode, one or more components of the first device;
   initiate reactivation of the one or more components of the first device;
   receive, while the one or more components are being reactivated, a poll request from the second device;
   transmit, in response to the poll request and prior to the reactivation of the one or more components being complete, a response to indicate to the second device that the first device is not yet ready for further communication with the second device;
   engage, subsequent to the completion of the reactivation of the one or more components, in further communication with the second device;
   initiate the reactivation of the one or more components of the first device, in response to receiving a communication request from the second device while the first device is to operate in the power savings mode; and
   deactivate, while the first device is to operate in the power saving mode, a clock generator that is to supply a clock signal to at least one component of the one or more components.

2. The one or more non-transitory computer-readable storage media of claim 1, wherein the instructions further cause the processor to:
   operate, while the first device is to operate in the power saving mode, a communication interface of the first device that is to communicate with the second device.

3. The one or more non-transitory computer-readable storage media of claim 1, wherein the second device is to at least temporarily refrain from communicating with the first device after receiving the response.

4. The one or more non-transitory computer-readable storage media of claim 1, wherein the instructions further cause the processor to:
   communicate, over a Universal Serial Bus (USB) connection, with the second device.

5. The one or more non-transitory computer-readable storage media of claim 1, wherein the poll request is a first poll request, wherein the response is a first poll response, and wherein the instructions further cause the processor to:
   receive, prior to the reactivation of the one or more components being complete and subsequent to a transmission of the first response, a second poll request from the second device; and
   transmit, in response to the second poll request and prior to the reactivation of the one or more components being complete, a second response to indicate to the second device that the first device is not yet ready for further communication with the second device.

6. A first apparatus comprising:
   a communication interface to communicate with a second apparatus; and circuitry coupled to the communication interface, the circuitry to:
  cause the first apparatus to enter, in response to a failure of the communication interface to receive any communication from the second apparatus for at least a threshold period of time, a power saving mode,
  cause deactivation of one or more components of the first apparatus, while the first apparatus is to operate in the power saving mode, and
  initiate reactivation of the one or more components,
wherein the communication interface is to receive, prior to the reactivation of the one or more components being complete, a poll request from the second apparatus,
wherein the communication interface is to transmit, in response to the poll request and prior to the reactivation of the one or more components being complete, a response to indicate to the second apparatus that the first apparatus is not yet ready for further communication with the second apparatus,
wherein the communication interface is to engage, subsequent to the completion of the reactivation of the one or more components, in further communication with the second apparatus and
wherein the circuitry is to initiate the reactivation of the one or more components, in response to the first apparatus receiving a communication request from the second apparatus while the first apparatus is to operate in the power savings mode.

7. The first apparatus of claim 6, wherein the circuitry is to:
  cause deactivation of a clock generator that is to supply a clock signal to at least one component of the one or more components, while the first apparatus is to operate in the power saving mode.

8. The first apparatus of claim 6, wherein the circuitry is to:
  cause operation of a communication interface of the first apparatus that is to communicate with the second apparatus, while the first apparatus is to operate in the power saving mode.

9. The first apparatus of claim 6, wherein the second apparatus is to at least temporarily refrain from communicating with the first apparatus after receiving the response.

10. The first apparatus of claim 6, wherein the communication interface is to:
  communicate, over a Universal Serial Bus (USB) connection, with the second apparatus.

11. The first apparatus of claim 6, wherein the poll request is a first poll request, wherein the response is a first poll response, and wherein the communication interface is to:
  receive, prior to the reactivation of the one or more components being complete and subsequent to a transmission of the first response, a second poll request from the second apparatus; and
  transmit, in response to the second poll request and prior to the reactivation of the one or more components being complete, a second response to indicate to the second apparatus that the first apparatus is not yet ready for further communication with the second apparatus.

12. A system comprising:
  a communication interface;
  a memory to store instructions; and
  a processor coupled to the memory,
  wherein the system is to enter a power saving mode,
  wherein the processor is to initiate an exit from the power saving mode,
  wherein the communication interface is to receive, prior to a completion of the exit from the power saving mode, a poll request from an external device,
  wherein the communication interface is to transmit, in response to the poll request and prior to the completion of the exit from the power saving mode, a response to indicate to the external device that the system is not yet ready for further communication with the external device; and
  wherein the system further comprises:
  a component; and
  a clock generation circuitry to supply a clock signal to the component, wherein the system is to operate the component and the clock generation circuitry in a low power mode while the system is to enter the power saving mode.

13. The system of claim 12, wherein the communication interface is to:
  subsequent to the completion of the exit from the power saving mode, engage in further communication with the external device.

14. The system of claim 12, wherein the system is to:
  enter the power saving mode in response to a failure to receive any communication from the external device for at least a threshold period of time.

15. The system of claim 12, wherein the system is to:
  receive a sequence of poll requests from the external device prior to the completion of the exit from the power saving mode; and
  transmit, in response to the sequence of poll requests and prior to the completion of the exit from the power saving mode, a corresponding sequence of responses to indicate to the external device that the system is not yet ready for further communication with the external device.

16. The system of claim 12, wherein the external apparatus is to at least temporarily refrain from communicating with the system after receiving the response.

17. A method comprising:
  entering, by a first device and in response to a failure to receive any communication from a second device for at least a threshold period of time, a power saving mode;
  initiating an exit from the power saving mode;
  receiving, while the first device is exiting the power saving mode, a poll request from the second device;
  transmitting, in response to the poll request and prior to the exit from the power saving mode being complete, a response to indicate to the second device that the first device is not yet ready for further communication with the second device;
  engaging, subsequent to the completion of the exit from the power saving mode, in further communication with the second device; and
  deactivating a clock generator that is to supply a clock signal to at least one component of the one or more components, while the first device is to operate in the power saving mode.

18. The method of claim 17, wherein initiating the exit from the power saving mode comprises:
  initiating the exit from the power saving mode, in response to receiving a communication request from the second device while the first device is operating in the power savings mode.

19. The method of claim 17, further comprising:
  temporarily refraining from communicating with the second device after transmitting the response.

20. The method of claim 17, wherein engaging in further communication with the second device comprises:
  engaging in further communication with the second device over a Universal Serial Bus (USB) connection.

21. The method of claim 17, wherein means for engaging in further communication with the second apparatus comprises:
  means for engaging in further communication with the second apparatus over a Universal Serial Bus (USB) connection.

22. An apparatus comprising:
  means for entering, in response to a failure to receive any communication from a second apparatus for at least a threshold period of time, a power saving mode;
  means for initiating an exit from the power saving mode;
  means for receiving, while the apparatus is exiting the power saving mode, a poll request from the second apparatus;
  means for transmitting, in response to the poll request and prior to the exit from the power saving mode being complete, a response to indicate to the second apparatus that the apparatus is not yet ready for further communication with the second apparatus;
  means for engaging, subsequent to the completion of the exit from the power saving mode, in further communication with the second apparatus; and
  means for causing deactivation of a clock generator that is to supply a clock signal to at least one component of the one or more components, while the apparatus is to operate in the power saving mode.

23. The apparatus of claim 22, wherein the means for initiating the exit from the power saving mode is to initiate the exit in response to receiving a communication request from the second apparatus while the apparatus is operating in the power savings mode.

24. The apparatus of claim 22, further comprising:
  means for temporarily refraining from communicating with the second apparatus after transmitting the response.

* * * * *